(12) United States Patent
Goss

(10) Patent No.: US 6,485,002 B1
(45) Date of Patent: Nov. 26, 2002

(54) SPLIT TRAILER JACK

(76) Inventor: Kevin Thomas Goss, Rte. 2, P.O. Box 164B, Brighton, IL (US) 62012

( * ) Notice: Subject to any disclaimer, the term of this patent is extended or adjusted under 35 U.S.C. 154(b) by 0 days.

(21) Appl. No.: 09/629,521

(22) Filed: Aug. 1, 2000

(51) Int. Cl.[7] .................................................. B66F 3/10
(52) U.S. Cl. ...................................... 254/420; 254/424
(58) Field of Search ................................ 254/418, 424, 254/420, 425, DIG. 3; 70/174, 177, 207, 163, 169

(56) References Cited

U.S. PATENT DOCUMENTS

| | | | |
|---|---|---|---|
| 2,159,395 A | * 5/1939 | Mersereau | ................... 254/424 |
| 2,638,315 A | * 5/1953 | Wagner | ....................... 254/424 |
| 3,288,435 A | * 11/1966 | Starkey | ...................... 254/424 |
| 3,314,692 A | 4/1967 | Karns | |
| 3,345,037 A | 10/1967 | Sweetland, Jr. | |
| 3,351,321 A | * 11/1967 | Grams et al. | ................ 254/424 |
| 3,764,109 A | * 10/1973 | Hollis | ......................... 254/424 |
| 4,589,632 A | 5/1986 | Smith | |
| 5,426,961 A | 6/1995 | Rimbaud et al. | |
| 5,462,269 A | 10/1995 | Schroeder et al. | |
| 5,579,862 A | 12/1996 | Bowden et al. | |
| 5,782,115 A | 7/1998 | Judy | |
| 5,797,285 A | 8/1998 | Sackowitz | |

* cited by examiner

Primary Examiner—Robert C. Watson
(74) Attorney, Agent, or Firm—Haverstock, Garrett & Roberts LLP

(57) ABSTRACT

A trailer tongue jack system which in an exemplary embodiment has separable upper and lower housings which must be coupled together to form a complete operable system, and a driveshaft with a recessed non-standard coupling which must be coupled in order to allow the housings to be coupled.

12 Claims, 4 Drawing Sheets

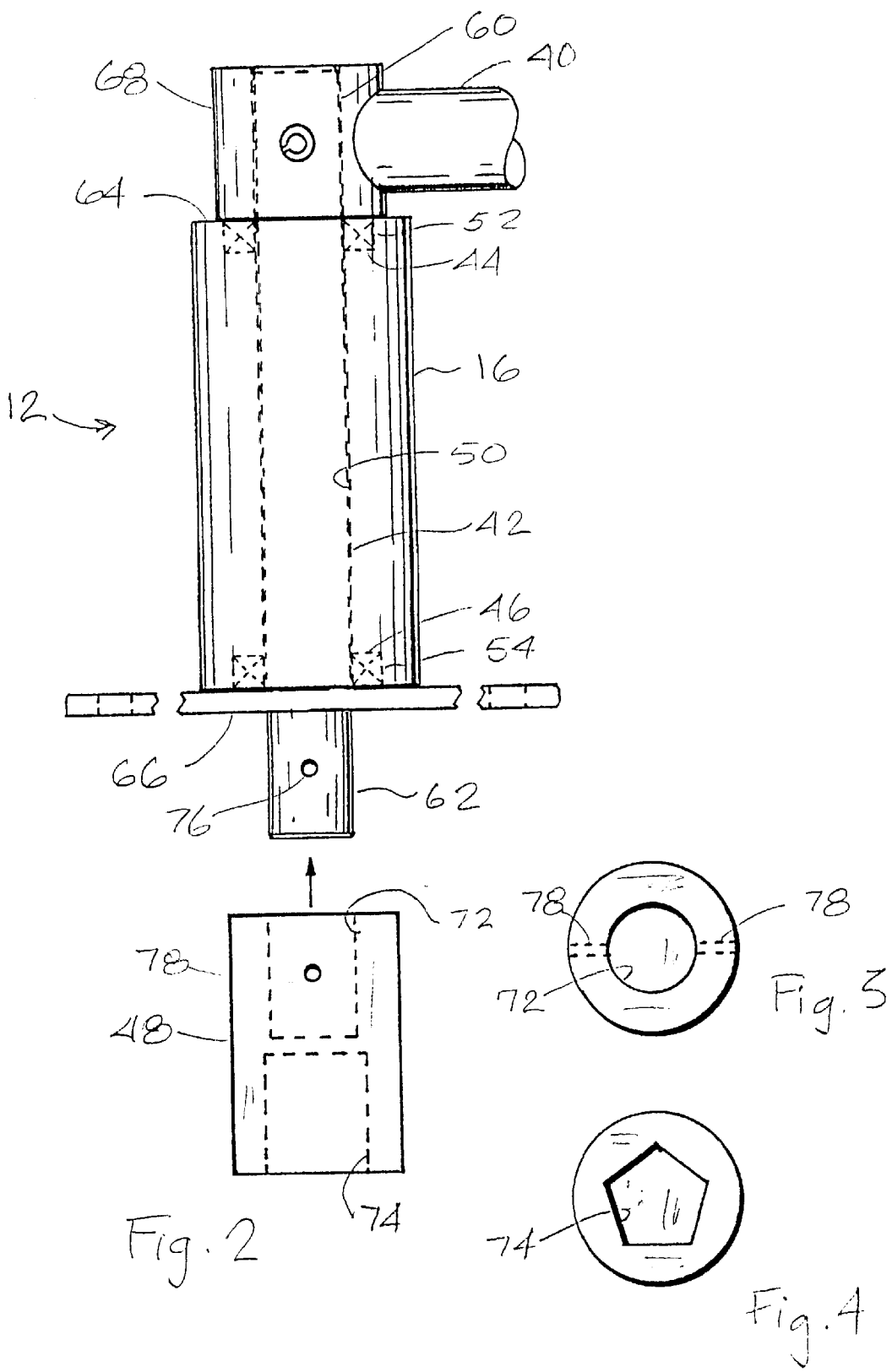

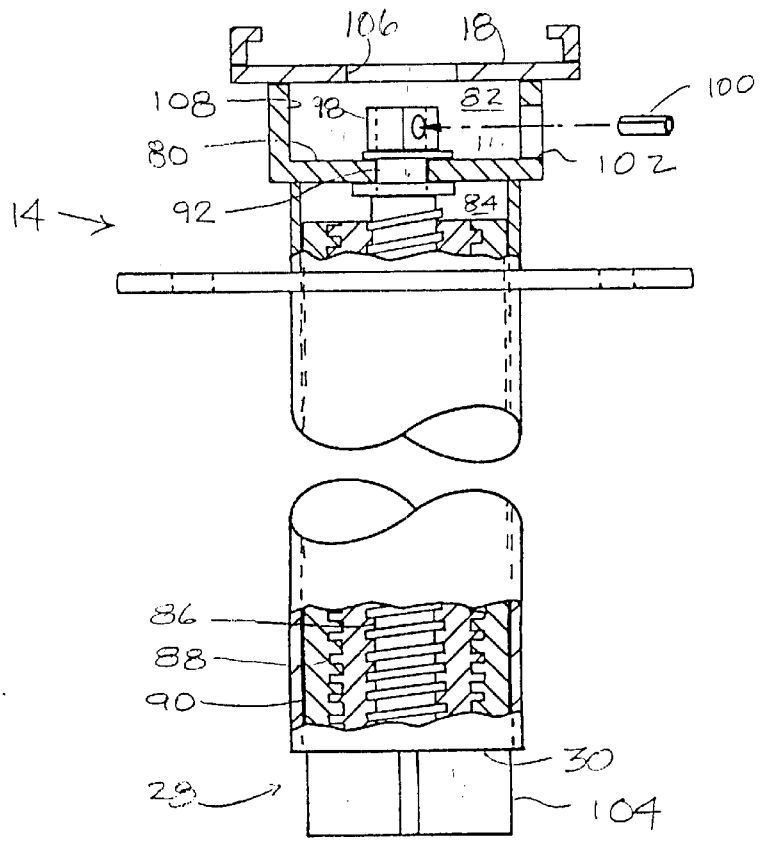
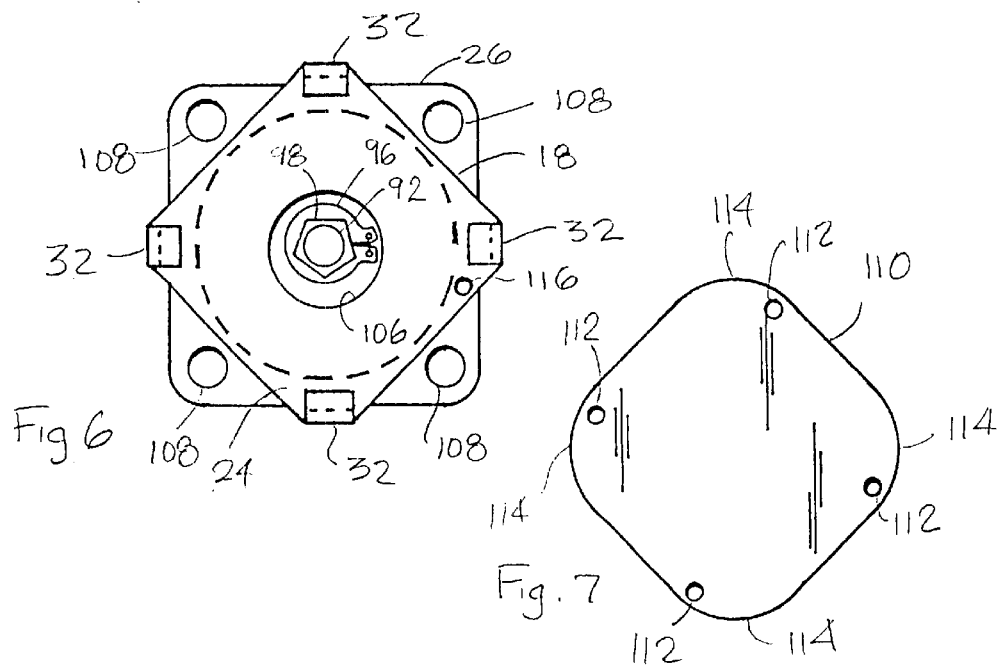
Fig. 5
Fig. 6
Fig. 7

SPLIT TRAILER JACK

BACKGROUND OF THE INVENTION

This invention relates to instruments for applying pressure and more particularly to jacks for trailer tongues.

Standard trailer tongue jacks sometimes pose two significant problems, interference with lowering of tailgates of towing vehicles and lack of effective security against theft. A trailer jack that allows for lowering of a tailgate while the trailer is attached to the vehicle is known. See, for example, U.S. Pat. No. 3,314,692. A vehicle jack with anti-theft features is known. See, for example. U.S. Pat. No. 5,782, 115. It would be desirable to have a trailer jack with both features in a convenient combination.

BRIEF SUMMARY OF THE INVENTION

In an exemplary embodiment, a trailer jack system for a trailer tongue is provided with convenient tailgate non-interference and convenient anti-theft features in a single package. The trailer jack system includes separable top and bottom housings which must be aligned and engaged to render the system operable for raising or lowering of a trailer tongue. The bottom housing is adapted to be permanently affixed to a trailer tongue. The top housing is rapidly and easily separable from the bottom housing for allowing a motor vehicle tailgate to be lowered while the trailer is attached to the motor vehicle and for providing security against theft of the trailer when the trailer is left unattached and unattended.

The top housing has a rotary driveshaft therein, a first coupling on a lower end of the driveshaft, the coupling having a first set of engagement surfaces of a non-standard shape. The bottom housing has a selectively downwardly extendable and retractable jack having a jackscrew with an upper end within the housing. A second coupling is provided on the upper end of the jackscrew. The second coupling has a second set of engagement surfaces of a non-standard shape configured to mate with and engage the first set of engagement surfaces. A releasable connector is provided for selectively, and rapidly connecting and disconnecting the upper and lower housings so as to securely maintain the engagement of the first and second couplings and yet allow for rapid disconnection to conveniently disengage the first and second couplings Optionally, a lockable cover for the bottom housing is provided to prevent unauthorized access to the second coupling

BRIEF DESCRIPTION OF THE DRAWINGS

FIG. 2 is a side view of a top portion of the jack system of FIG. 1, FIG. 3 is top view of the drive coupling of FIG. 1, FIG. 4 is a bottom view of the drive coupling of FIG. 3, FIG. 5 is a side view of an exemplary bottom portion of the jack system of FIG. 1, with portions cut away, FIG. 6 is a top view of the bottom portion of FIG. 5, FIG. 7 is a top view of an exemplary cover plate for the bottom portion of FIG. 5.

DETAILED DESCRIPTION OF THE INVENTION

Figure 1:
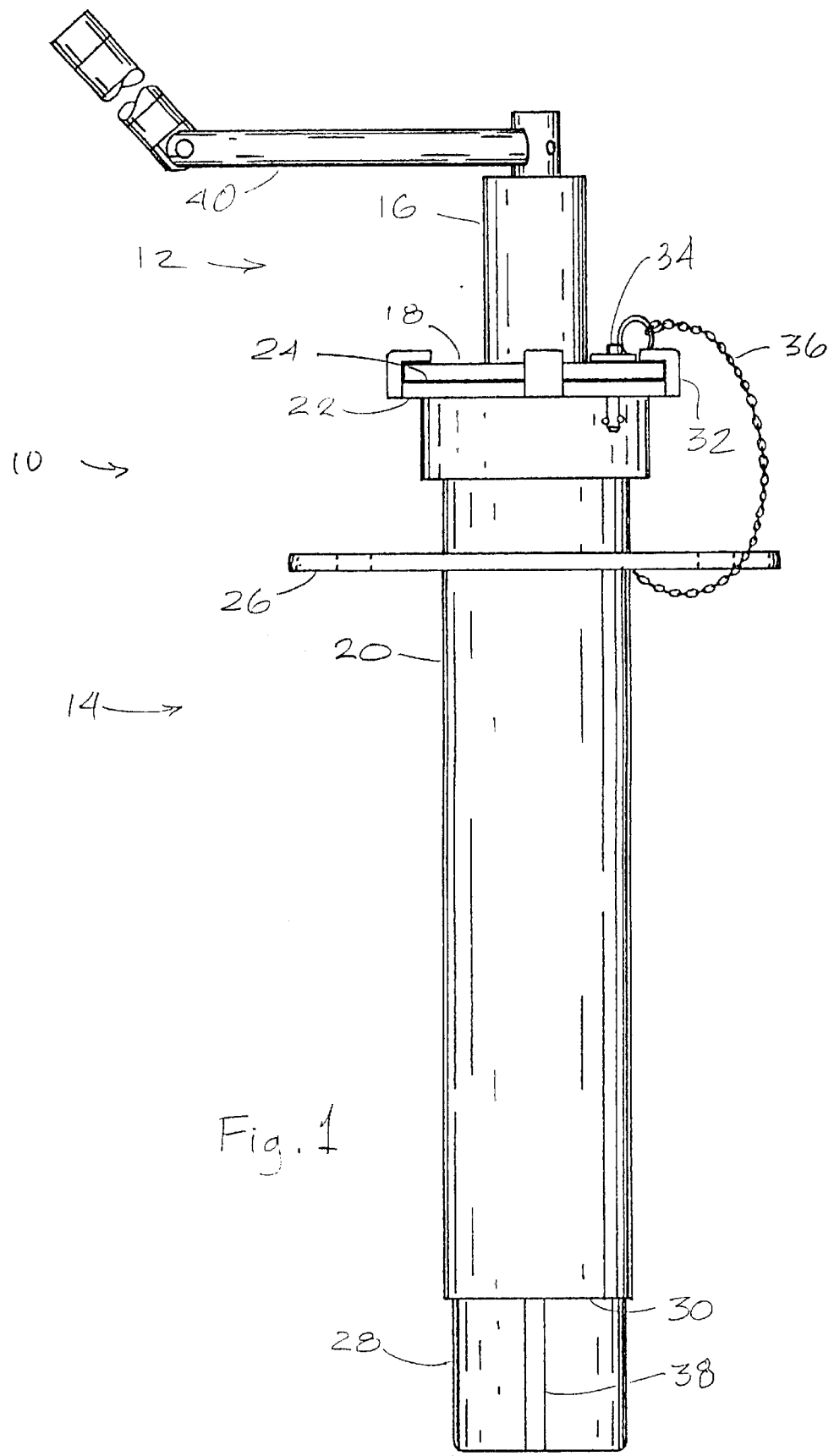
FIG. 1 is a side view of a trailer jack system according to a first embodiment of the invention.

FIG. 1 is a side elevational view of an exemplary, trailer jack system 10. System 10 includes a top portion 12 and a bottom portion 14. Top portion 12 has a tubular cylindrical housing 16 with a first connector plate 18 at a lower end and provides rotary drive power for system 10. Bottom portion 14 has a tubular housing 20 having a second connector plate 22 at an upper end 24, an attachment flange or plate 26 and a jack 28. Bottom portion 14 receives rotary drive force from top portion 12 and converts that force into vertical force to extend or retract jack 28 from housing 20 for raising or loitering a trailer tongue (not shown) attached to flange 26. Attachment flange 26 is slightly below upper end 24, but could be at or near upper end 24, if desired. Housing 20 contains a jack 28. Jack 28 projects from a lower end 30 of housing 20. A plurality of tabs 32 are provided on connector plate 22 to assist in holding first connector plate 18 and second connector plate 22 together and thus top portion 12 on bottom portion 14. A locking pin 34 attached to top portion be a chain 36, further assists in holding plates 22 and 24 together and preventing lateral movement of plates 22 and 24 relative to each other. A longitudinal centering groove 38 on an exterior of jack 28 and a corresponding longitudinal centering rib (not shown) projecting inwards from housing 20 assist in preventing rotation of jack 28 within lower housing 20. A handle 40 of top portion 12 is turned by a user (not shown) to provide rotational force to power the jack. An electrical motor or other source of rotational drive force could be substituted for handle 40, if desired.

FIG. 2 is a side elevational view of top portion 12. Top portion 12 includes housing 16, handle 40, a driveshaft 42, a top bearing 44, a bottom bearing 46, first connector plate 18, and a non-standard female drive coupling 48. Housing 16 is a cylindrical body with a longitudinal axial bore 50 adapted to hold driveshaft 42. Bore 50 is enlarged at each end to produce annular recesses 52 and 54 adapted to hold bearings 44. Driveshaft 42 has an upper end 60 and a lower end 62 that extend out of a top 64 and a bottom 66 of housing 16. A mounting collar 68 of handle 40 is fastened to upper end 58 by a pin 70 or other fastening means such as threads, bolt, set screw, glue or weld. Coupling 48 is a cylindrical body with an upper socket 72, configured to receive lower end 60, and a lower socket 74, configured to receive a male coupling (described below) of bottom portion 14. Collar 68 and coupling 48 prevent driveshaft 42 from moving upwardly or downwardly out of housing 14. Snap rings (not shown) could be added to engage peripheral grooves in driveshaft 42, if desired, to hold shaft 42 and bearings 44 in bore 50 even if coupling 48 or collar 68 were removed. Lower socket 74 is of a non-standard configuration, such as pentagonal. Coupling 48 is mounted on lower end 48 by forcing a pin (not shown) through a first transverse pinhole 76 in lower end 62 and a pair of second transverse pinholes 78 in coupling 48.

FIG. 3 is top view of exemplar drive coupling 48. Upper socket 72 is cylindrical to match lower end 62 and pinholes 78 are diametrically aligned.

FIG. 4 is a bottom view of drive coupling 48. Lower socket 74 is pentagonal. Other non-standard socket configurations could be utilized in place of pentagonal socket 74, to reduce the chance that a socket 74 from one jack system 10 would fit another jack system similar to system 11. For example, ten different socket designs might be used, so that there is only a ten percent chance that a top portion from system 10 would function in another similar system or vice versa. Coupling 48 serves to engage lower end 62 with coupling 98. Lower socket 74 is pentagonal. Pentagonal sockets are not readily available to the general public, and standard socket wrenches do not readily work on a polygonal nut width an odd number of surfaces, such as 3,5,7,9, etc. sides. Accordingly pentagonal sockets are examples of non-standard sockets, as would triangular, heptagonal or nonagonal sockets. Likewise any oddly lobed socket (not shown) would be non-standard all with the intention of making standard sockets and standard tools not couple sufficiently to allow any such coupling substituted for coupling 48 to engage coupling 98.

FIG. 5 is a side, partially in cross-section, of bottom portion 14 with portions cut aa, v. A bearing plate 80 divides the interior of housings 20 into an upper coupling chamber 82 and a lower jackscrew chamber 84. Jack 28 comprises a jackscrew 86, an intermediate telescoped screw sleeve 88, and an outer screw sleeve 90, which are engaged for extension and retraction in conventional manner upon the rotation of jackscrew 86. Jack 28 has an upper portion 92 which projects upwardly through an opening 94 in bearing plate 80 into upper chamber 82. A snap ring 96 locks into a corresponding groove (not shown) in upper portion 92 to prevent jack 28 from dropping out of housing 20. A male coupling 98, having a pentagonal outer surface matching pentagonal lower socket 74 is pinned by a pin 100 to upper portion 92. Upper chamber 82 is provided with an access hole 102 to allow pin 100 to be inserted through male coupling 98 and upper portion 92 in similar manner to that described previously for coupling 48. Access hole 102 also allows moisture to drain from upper chamber 82. A bottom portion 104 of jack 28 projects out of bottom 30 of housing 20 with the remainder of jack 28 contained within lower chamber 84. A central circular drive opening 106 in second connector plate 24 allows coupler 48 to pass into upper chamber 82 to engage coupler 98 to provide rotary powter to jack 28. Wall 108 of chamber 82 and second connector plate 22 help block an attempt to raise or lower jack 28 using any common tool such as a wrench or pliers. Wall 108 and plate 22 thus deter operation of jack 28 by anone not having top portion 12.

FIG. 6 is a top view of the bottom portion 14. Snap ring 96 engages upper portion 90 and male coupling 98 is pinned to upper portion 90 over snap ring 96. Connector plate 18 extends radially inward from tabs 32 to a circular access opening 106. Access opening 106 is only slightly larger in diameter than the outer diameter of female coupling 48 to minimize tinanted or unauthorized access to coupling 98. Coupling 48 can be passed through opening 106 and over and around male coupling 98 to provide rotational drive force to jackscrew 86 but wrenches, pliers and other lateral gripping devices are thwarted by plate 18. Attachment plate 26 has four bolt holes 108 for attaching plate 26 to a trailer tongue. Plate 26 could instead be welded or otherwise permanently attached to a trailer if preferred.

FIG. 7 is a top view of an exemplary cover plate 110 configured to cover upper end 24 and opening 106 while underlying tabs 32. Cover plate 110 has four locking holes 112 configured to receive locking pin 34 or a padlock (not shown) to further deter theft. Cover plate 110 has rounded corners 114 to allow plate 110 to be placed on second connector plate 18 with corners 114 between tabs 32 and then rotated so that corners 114 are under tabs 32. One locking hole 112 of cover plate 110 then aligns with a corresponding locking hole 116 in plate 18 to allow plate 110 to be locked onto plate 18. Plate 110 also assists in keeping debris and moisture out of chamber 82. First connector plate 18 has the same rounded corners as corners 114 and the same locking holes 112 and the same outside dimensions as plate 110 so that plate 18 and plate 110 each fit securely under tabs 34.

Figure 8:
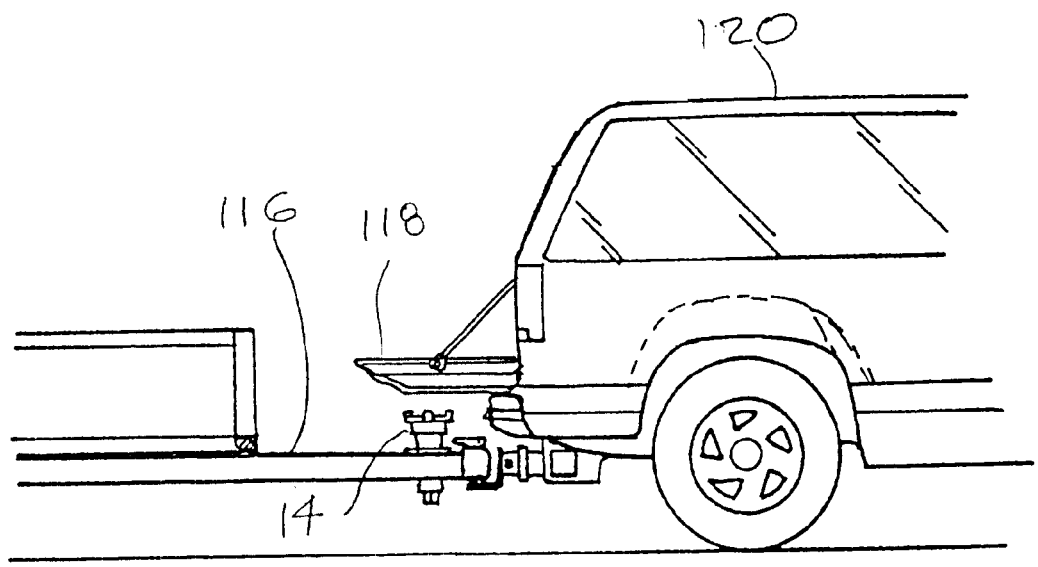
FIG. 8 is a side view of the exemplary jack system of FIG. 1 installed on a trailer tongue with the top portion removed and a tossing vehicle attached.

FIG. 8 is a side view of bottom portion 14 of jack system 10 installed on a trailer tongue 116 with a tailgate 118 of a tossing vehicle 120 lowered over portion 14. Top portion 12 has been removed. Access to the rear interior of vehicle 120 is thus facilitated and damage to tailgate 118 from being lowered onto the top portion is prevented.

In operation, attachment plate 26 is attached permanently to trailer tongue 116 or other similar object to be raised and lowered. Handle 40 is rotated about the axis of housing 16 to rotate shaft 42, coupling 48 and 98, and jackscrew 86 to extend or retract lower end 104 to raise or lower tongue 116. When the desired extension or retraction of lower end 104 is obtained, locking pin 34 is removed from holes 112 and 116 and plate 18 is rotated relative to plate 22 and top portion 12 is removed from bottom portion 14. If additional security is desired, cover plate 110 is then placed atop second connector plate 18 and rotated to place corners 114 under tabs 32. A padlock (not shown) or locking pin 34 is then placed through holes 112 and 116 to block opening 106 and help prevent access to second coupling 98. This process is reversed to reactivate system 10 for subsequent raising or lowering While the invention has been described in terms of various specific embodiments, those skilled in the art will recognize that the invention can be practiced with modification within the spirit and scope of the claims.

What is claimed is:

1. A jack system for a trailer tongue, comprising
a top housing having a rotary driveshaft therein.
a first coupling on a lower end of said driveshaft, said coupling having a first set of engagement surfaces of a non-standard shape,
a bottom housing having a selectively extendable and retractable jackscrew having an upper end within said bottom housing:
a second coupling on an upper end of said jackscrew, said coupling having a second set of engagement surfaces of a non-standard shape adapted to mate with and engage said first set of engagement surfaces;
a releasable connector for selectively connecting and disconnecting said top and bottom housings so as to, respectively, engage and disengage said first and second coupling.

2. A jack system in accordance with claim 1 wherein said releasable connector comprises a first connector plate on the first housing and a second connector plate on the second housing.

3. A jack system in accordance with claim 2 wherein said releasable connector further comprises tabs on one of said connector plates for engaging the other of said connector plates.

4. A jack system in accordance with claim 1 and a further comprising a cover plate configured to engage a lower portion of said releasable connector for selectively blocking access to said second coupling when said upper and lower housing are disconnected.

5. A jack system in accordance with claim 1, wherein said releasable connector includes an upper plate on a lower end of said top housing and a lower plate on an upper end of said bottom housing.

6. A jack system in accordance with claim 1, further comprising a removable cover adjacent the an upper end of said bottom housing to block unauthorized access to said second coupling.

7. A jack system in accordance with claim 6, wherein said cover is a plate.

8. A jack system in accordance with claim 6, wherein said cover and said housing comprise aligned apertures configured to receive a lock to be inserted through said apertures to lock said cover to said bottom housing.

9. A jack system for a trailer tongue, comprising
   a driveshaft,
   a first coupling on a lower end of said driveshaft, said coupling having a first set of engagement surfaces of a non-standard shape,
   a housing configured for attachment to the trailer tongue and hazing an upwardly open upper chamber adjacent an upper end of said housing and a lower chamber below said upper chamber,
   a connector plate overlying said upper chamber and defining an access hole,
   a selectively extendable and retractable jackscrew having an upper portion within said upper chamber a lower portion in said lower chamber, and
   a second coupling on said upper portion of said jackscrew and aligned with said access hole, said coupling having a second set of engagement surfaces of a non-standard shape configured to releasably mate with and engage said first set of engagement surfaces and said second coupling being disposed within said upper chamber and below said connector plate.

10. A jack system in accordance with claim 9, further comprising a removable cover configured to releasably engage said connector plate to block unauthorized access to said second coupling.

11. A jack system in accordance with claim 10 wherein said cover and housing have aligned apertures configured to permit a lock to be inserted through said apertures to lock said cover to said housing.

12. A jack system in accordance with claim 9 wherein said connector plate has a plurality of upwardly and inwardly projecting peripheral tabs.

* * * * *

UNITED STATES PATENT AND TRADEMARK OFFICE
CERTIFICATE OF CORRECTION

PATENT NO. : 6,485,002 B1
DATED : November 26, 2002
INVENTOR(S) : Kevin Thomas Goss It is certified that error appears in the above-identified patent and that said Letters Patent is hereby corrected as shown below:

Column 1,
Line 66, after "exemplary" delete ",".

Column 2,
Line 60, "11" should be -- 10 --.

Column 3,
Line 9, "side," should be -- side view --.
Line 10, "aa, v." should be -- away. --.
Line 11, "housings" should be -- housing --.
Line 44, "tinanted" should be -- unwanted --.

Column 4,
Line 29, "therein." should be -- therein, --.
Line 35, "housing:" should be -- housing; --.

Column 5,
Line 5, "comprising" should be -- comprising: --.

Signed and Sealed this

Fourth Day of March, 2003

JAMES E. ROGAN
*Director of the United States Patent and Trademark Office*